United States Patent
Feng et al.

(10) Patent No.: US 11,962,115 B2
(45) Date of Patent: Apr. 16, 2024

(54) EXPANSION DEVICE WITH POWER AND DATA CONNECTIONS

(71) Applicant: LUXSHARE PRECISION INDUSTRY COMPANY LIMITED, Shenzhen (CN)

(72) Inventors: Yun Feng, Shenzhen (CN); Min Fan, Shenzhen (CN); Wenjun Tang, Shenzhen (CN)

(73) Assignee: LUXSHARE PRECISION INDUSTRY COMPANY LIMITED, Shenzhen (CN)

(*) Notice: Subject to any disclaimer, the term of this patent is extended or adjusted under 35 U.S.C. 154(b) by 230 days.

(21) Appl. No.: 17/512,868

(22) Filed: Oct. 28, 2021

(65) Prior Publication Data

US 2022/0344882 A1 Oct. 27, 2022

(30) Foreign Application Priority Data

Apr. 21, 2021 (CN) .......................... 202110428578.7

(51) Int. Cl.
*H01R 13/642* (2006.01)
*H01R 24/28* (2011.01)
*H01R 31/06* (2006.01)

(52) U.S. Cl.
CPC ........... *H01R 31/065* (2013.01); *H01R 24/28* (2013.01)

(58) Field of Classification Search
CPC .............................. H01R 31/065; H01R 24/28
See application file for complete search history.

(56) References Cited

U.S. PATENT DOCUMENTS

| 5,775,951 A * | 7/1998 | Gargiulo ................ H01R 31/06 439/31 |
| 6,733,329 B2 * | 5/2004 | Yang .................... H01R 31/065 439/518 |

(Continued)

FOREIGN PATENT DOCUMENTS

| CN | 106532385 A | 3/2017 |
| CN | 108023227 B | 3/2020 |

(Continued)

*Primary Examiner* — Neil Abrams
(74) *Attorney, Agent, or Firm* — Birch, Stewart, Kolasch & Birch, LLP

(57) ABSTRACT

A multifunctional single-interface electronic expansion device, comprising an external electronic expansion device and a power transmitting cable. The external electronic expansion device comprises a device body, an electrical connecting module, a data signal processing module, a power transmitting module, and a first assembling member. The device body comprises a first wall surface and a second wall surface. The electrical connecting module is disposed at the device body and is exposed from the first wall surface to be electrically connected with or detached from an interface of a first electronic device. The data signal processing module is electrically connected with the electrical connecting module. The power transmitting module is electrically connected with the electrical connecting module. The power transmitting module comprises a power transmitting interface exposed from the second wall surface. The first assembling member which may be formed as an annular magnetic attracting body is disposed at the power transmitting interface.

12 Claims, 8 Drawing Sheets

(56) References Cited

U.S. PATENT DOCUMENTS

| | | | | |
|---|---|---|---|---|
| 6,790,077 B1* | 9/2004 | Chen | | H01R 31/06 |
| | | | | 439/502 |
| 6,796,849 B2* | 9/2004 | Villain | | H01R 13/6277 |
| | | | | 439/700 |
| 7,074,061 B1* | 7/2006 | Roth | | G06K 19/07743 |
| | | | | 439/131 |
| 7,204,723 B2* | 4/2007 | Sun | | H01R 13/514 |
| | | | | 439/701 |
| 7,393,247 B1* | 7/2008 | Yu | | H01R 12/716 |
| | | | | 439/638 |
| 7,513,038 B2* | 4/2009 | Koh | | H01R 13/6205 |
| | | | | 29/874 |
| 7,833,056 B1* | 11/2010 | Lee | | H01R 13/6581 |
| | | | | 439/946 |
| 7,841,903 B2* | 11/2010 | Saito | | H01R 13/6675 |
| | | | | 439/638 |
| 7,874,844 B1* | 1/2011 | Fitts, Jr. | | H01R 31/06 |
| | | | | 439/675 |
| 8,402,175 B2* | 3/2013 | Hwang | | H04M 1/72409 |
| | | | | 710/16 |
| 9,231,355 B2* | 1/2016 | Chang | | G06F 21/85 |
| 9,293,865 B2* | 3/2016 | Schwandt | | H01R 13/6476 |
| 9,362,664 B2* | 6/2016 | Yen | | H01R 13/6205 |
| 9,444,278 B2* | 9/2016 | Baurle | | H02J 7/0042 |
| 9,515,420 B2* | 12/2016 | Daoura | | H01R 13/502 |
| 9,935,391 B2* | 4/2018 | Wang | | H01R 13/514 |
| 10,333,249 B1* | 6/2019 | Wang | | H01R 13/6205 |
| 11,296,457 B2* | 4/2022 | Zhang | | H01R 24/60 |
| 2006/0194467 A1* | 8/2006 | Beasley | | H01R 13/6641 |
| | | | | 439/339 |
| 2015/0126070 A1* | 5/2015 | Candelore | | H01R 31/065 |
| | | | | 439/628 |
| 2015/0318650 A1* | 11/2015 | Qian | | H04B 1/3816 |
| | | | | 439/620.15 |
| 2016/0336775 A1* | 11/2016 | Cho | | H02J 7/0042 |

FOREIGN PATENT DOCUMENTS

| | | |
|---|---|---|
| CN | 112667542 A | 4/2021 |
| TW | 200602962 A | 1/2006 |
| TW | M444558 U1 | 1/2013 |
| TW | M540419 U | 4/2017 |
| TW | I644217 B | 12/2018 |
| TW | M578035 U | 5/2019 |

\* cited by examiner

EXPANSION DEVICE WITH POWER AND DATA CONNECTIONS

CROSS-REFERENCE TO RELATED APPLICATION

This application claims the priority benefit of Chinese Patent Application Serial Number 202110428578.7, filed on Apr. 21, 2021, the full disclosure of which is incorporated herein by reference.

BACKGROUND

Technical Field

The present disclosure relates to the technical field of external electronic expansion device, particularly to a multifunctional single-interface electronic expansion device and an external electronic expansion device which provide multiple functions but only occupy one interface of the electronic device.

Related Art

Conventional electronic devices are often equipped with multiple input/output interfaces for electrical connection with products applicable for the same or different specifications. For example, laptop computers are equipped with multiple universal serial bus interfaces (USB) and a high-definition multimedia interface (HDMI) to connect various external electronic expansion modules or peripheral electronic devices. The USB interface can be connected to a wireless signal transceiver for connecting a mouse or keyboard, a USB wireless card or a USB sound card for wireless communication, or it can be used to connect with a charging cable to charge a laptop computer. The HDMI interface can be used to connect with electronic devices such as display screens or projectors. Since the conventional electronic expansion modules or devices are respectively connected to the interfaces of the electronic devices, each external electronic expansion module or device occupies one interface. For example, when using the USB wireless signal transceiver and the charging cable of the mouse at the same time, two USB ports would be occupied. In the case of limited USB ports, multiple external electronic expansion modules or devices cannot be connected at the same time.

SUMMARY

The embodiments of the present disclosure provide a multifunctional single-interface electronic expansion equipment and an external electronic expansion device tended to solve the problem that the multiple external electronic expansion modules or devices occupy the multiple input and output interfaces at the same time.

The present disclosure provides an external electronic expansion device, comprising a device body, an electrical connecting module, a data signal processing module, a power transmitting module, and a first assembling member. The device body comprises a first wall surface and a second wall surface. The electrical connecting module is disposed at the device body and is exposed from the first wall surface. The electrical connecting module is electrically connected with or detached from an interface of a first electronic device. The data signal processing module is disposed in the device body and is electrically connected with the electrical connecting module. The power transmitting module is disposed in the device body and is electrically connected with the electrical connecting module. The power transmitting module comprises a power transmitting interface exposed from the second wall surface. The first assembling member is disposed at the power transmitting interface and is assembled with an electronic component connected to the power transmitting interface.

The present disclosure provides a multifunctional single-interface electronic expansion device, comprising an external electronic expansion device according to the above description, and a power transmitting cable. The power transmitting cable comprises an expansion end connecting member connected with the power transmitting interface, a device end connecting member electrically connected with a second electronic device, and a transmitting wire electrically connected with the expansion end connecting member and the device end connecting member.

In the embodiments of the present disclosure, by installing the data signal processing module and the power transmitting module to the external electronic expansion device, and by disposing the power transmitting interface to the device body, the power transmitting cable can be electrically connected to the first electronic device through the power transmitting interface of the external electronic expansion device when the external electronic expansion device is electrically connected with the first electronic device. Thus, the data signal processing module and the power transmitting module can be operated at the same time by occupying only one interface of the first electronic device.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
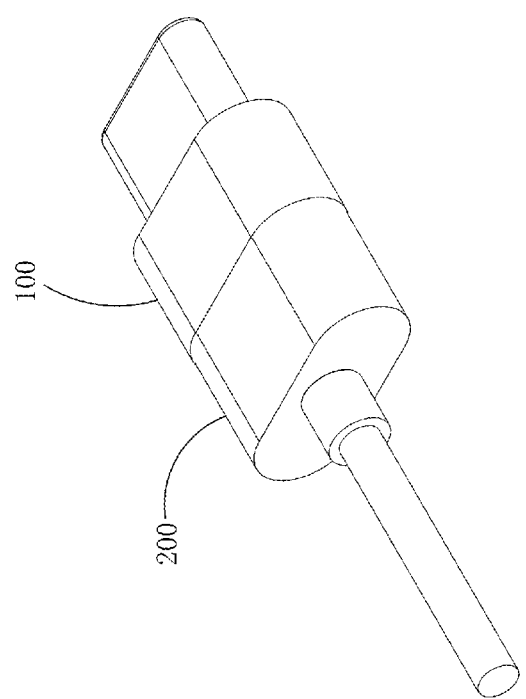
FIG. 1 is a perspective view of a multifunctional single-interface electronic expansion device of an embodiment of the present disclosure.
Figure 2:
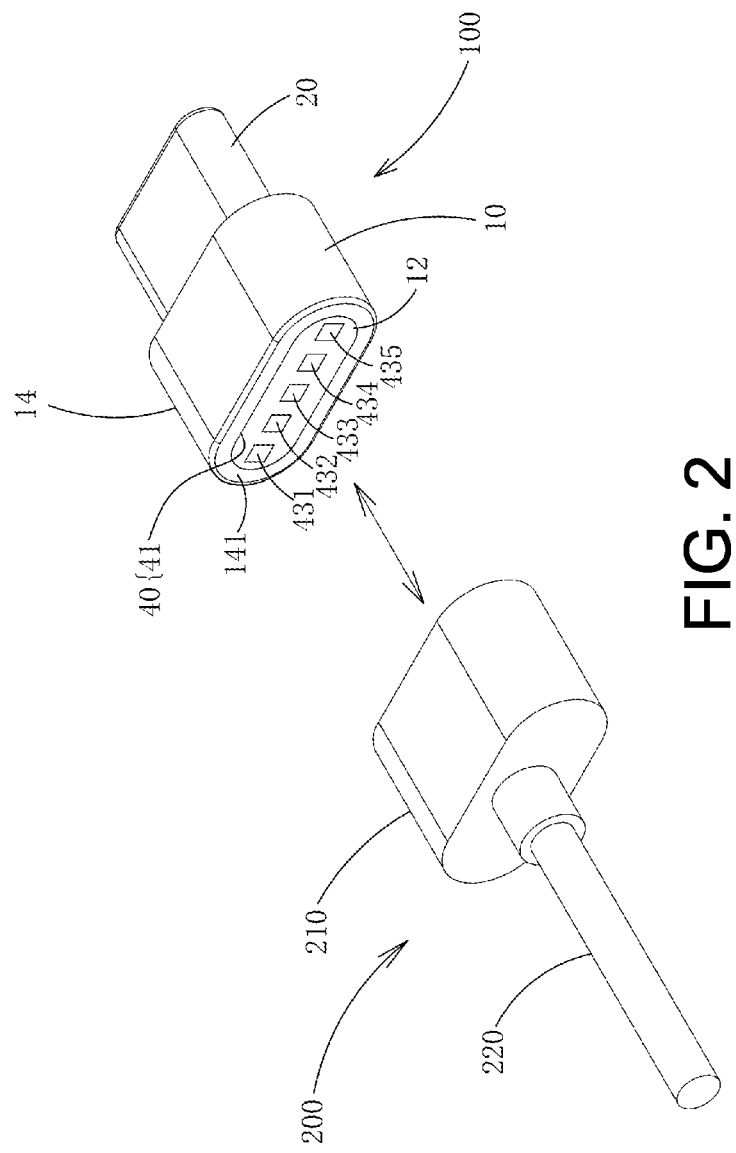
FIG. 2 is a perspective view when an external electronic expansion device and a power transmitting cable of a multifunctional single-interface electronic expansion device of FIG. 1 are disassembled of the present disclosure.
Figure 3:
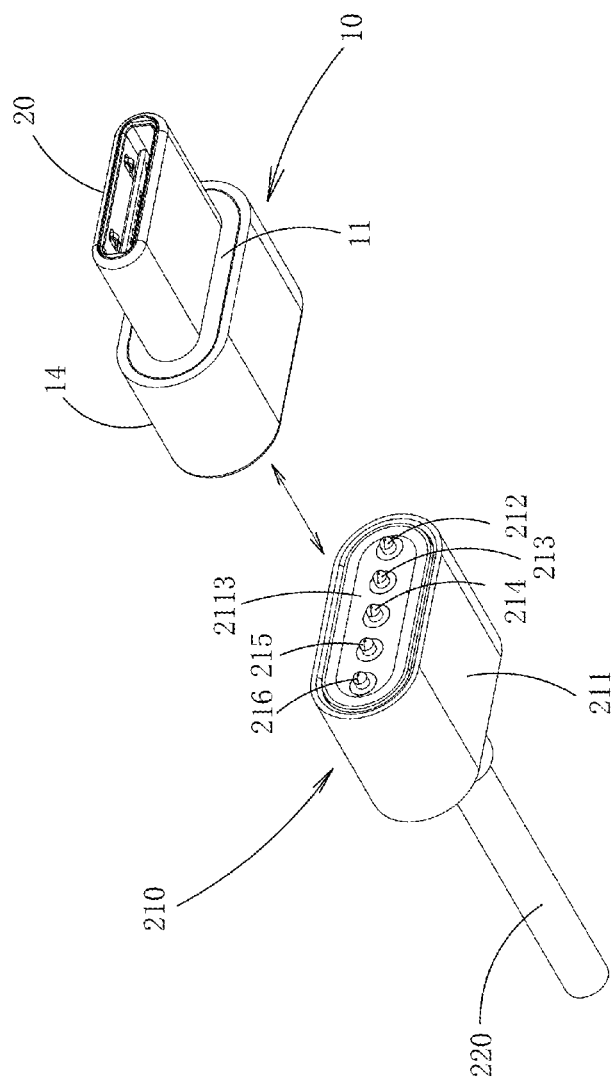
FIG. 3 is an exploded view in another perspective of FIG. 2.
Figure 4A:
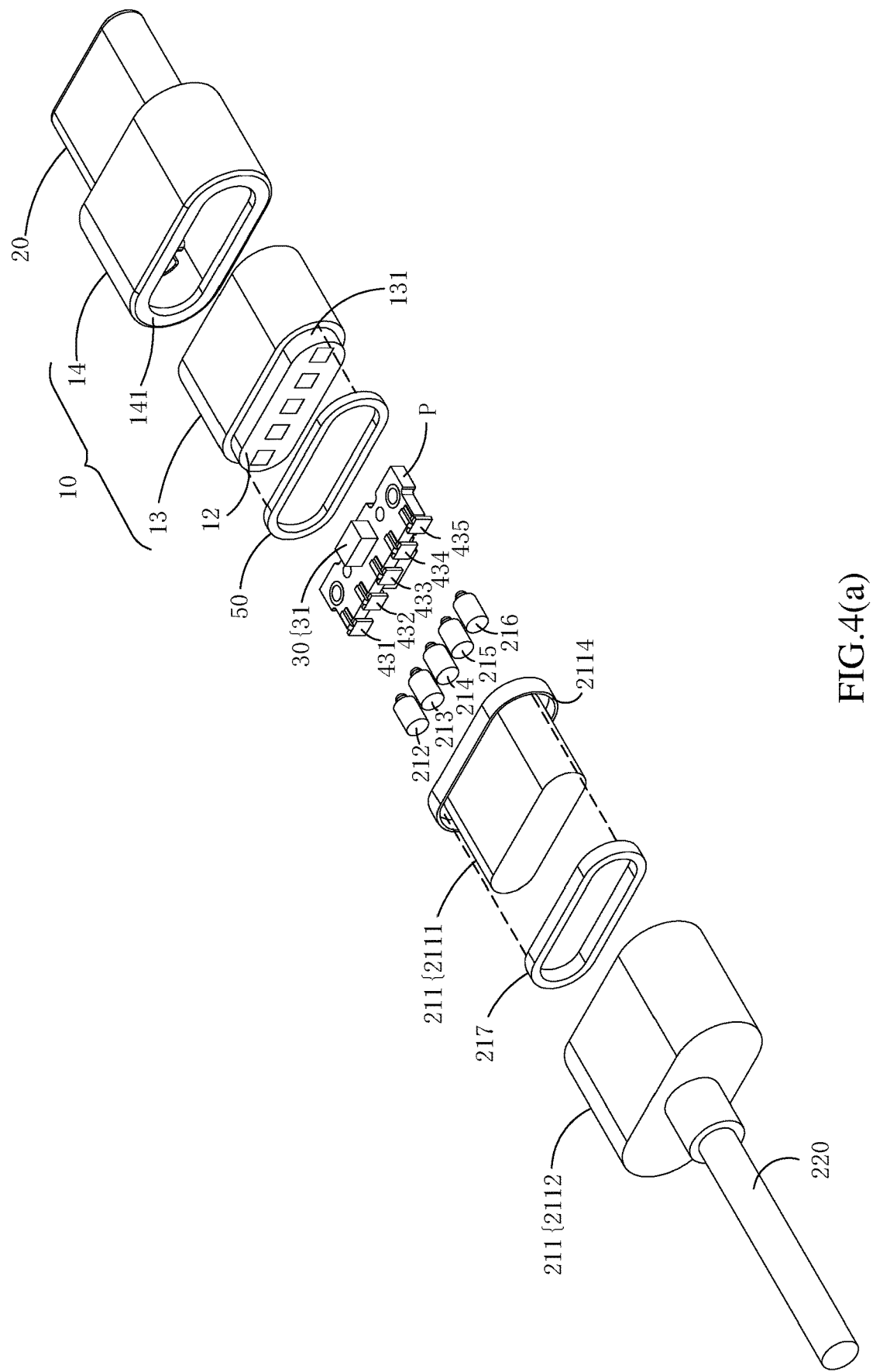
FIG. 4(a) is an exploded view of the external electronic expansion device and the power transmitting cable of the multifunctional single-interface electronic expansion device of FIG. 1.
Figure 4B:
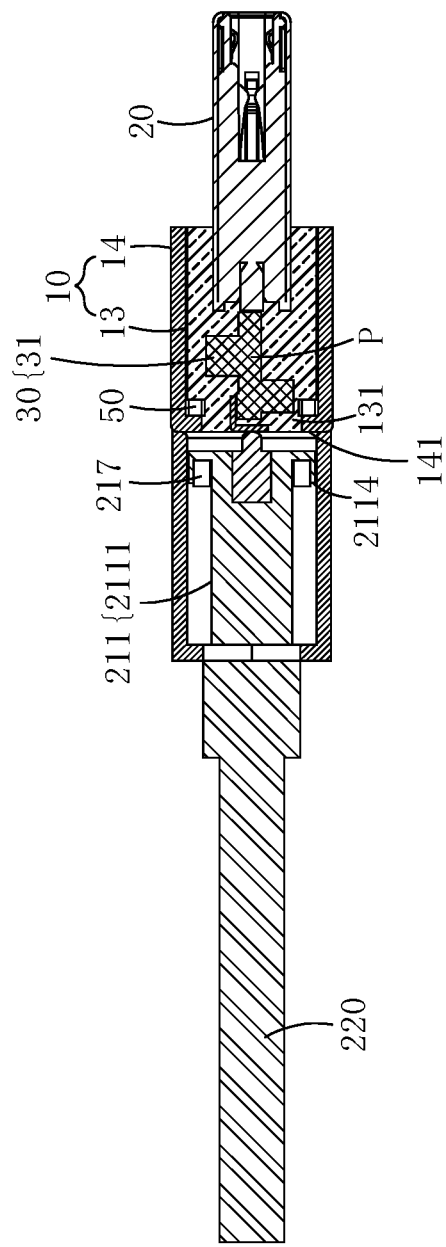
FIG. 4(b) is a cross-sectional view of external electronic expansion device and the power transmitting cable of the multifunctional single-interface electronic expansion device of FIG. 1.
Figure 5:
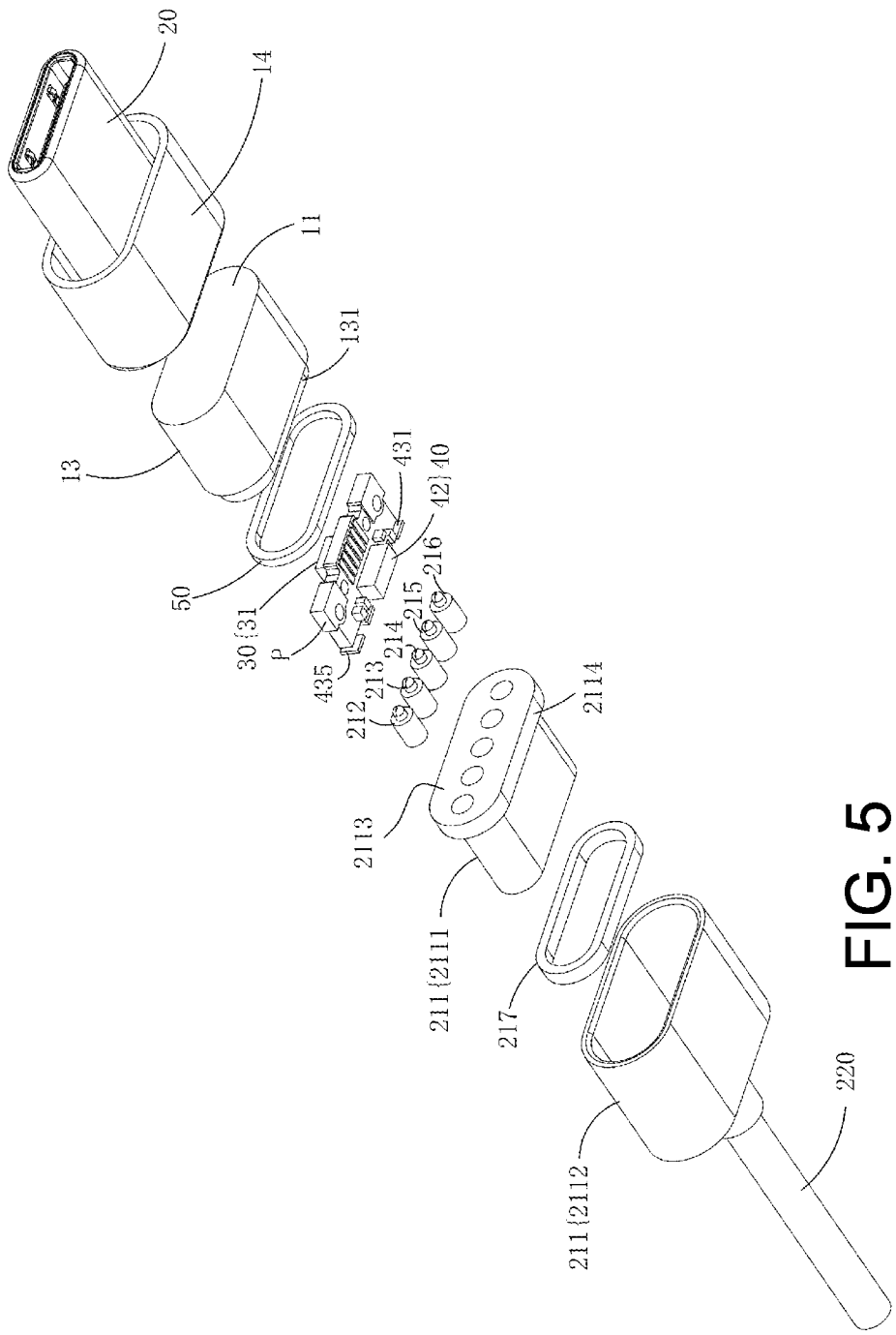
FIG. 5 is an exploded view in another perspective of FIG. 4(a)

FIG. 1 is a perspective view of an multifunctional single-interface electronic expansion device of an embodiment of the present disclosure. FIG. 2 is a perspective view when an external electronic expansion device and a power transmitting cable of a multifunctional single-interface electronic expansion device of FIG. 1 are disassembled of the present disclosure. FIG. 3 is an exploded view in another perspective of FIG. 2. FIG. 4(a) is an exploded view of the external electronic expansion device and the power transmitting cable of the multifunctional single-interface electronic expansion device of FIG. 1. FIG. 4(b) is a cross-sectional view of external electronic expansion device and the power transmitting cable of the multifunctional single-interface electronic expansion device of FIG. 1. FIG. 5 is an exploded view in another perspective of FIG. 4(a). As shown in the figures, in this embodiment, the multifunctional single-interface electronic expansion equipment comprises an external electronic expansion device 100 and a power transmitting cable 200. The power transmitting cable 200 can be connected with an external electronic expansion device 100 to be electrically connected to the external electronic expansion device 100 (shown in FIG. 2) or removed from the external electronic expansion device 100 with only the external electronic expansion device 100 is operated.

In this embodiment, the external electronic expansion device 100 comprises a device body 10, an electrical connecting module 20, a data signal processing module 30, a power transmitting module 40, and a first assembling member 50.

As shown in FIG. 2 and FIG. 3, the device body 10 comprises a first wall surface 11 and a second wall surface 12. In this embodiment, the first wall surface 11 and the second wall surface 12 are oppositely disposed, and in another embodiment, the first wall surface 11 and the second wall surface 12 could be adjacently disposed, which indicates that the arrangement could be determined according to the structural configuration of the electronic device. The device body 10 comprises a first insulating covering sleeve 13 and a first housing 14 surrounding the first insulating covering sleeve 13. Two opposite wall surfaces surrounding the first insulating covering sleeve 13 are respectively the first wall surface 11 and the second wall surface 12.

Figure 6:
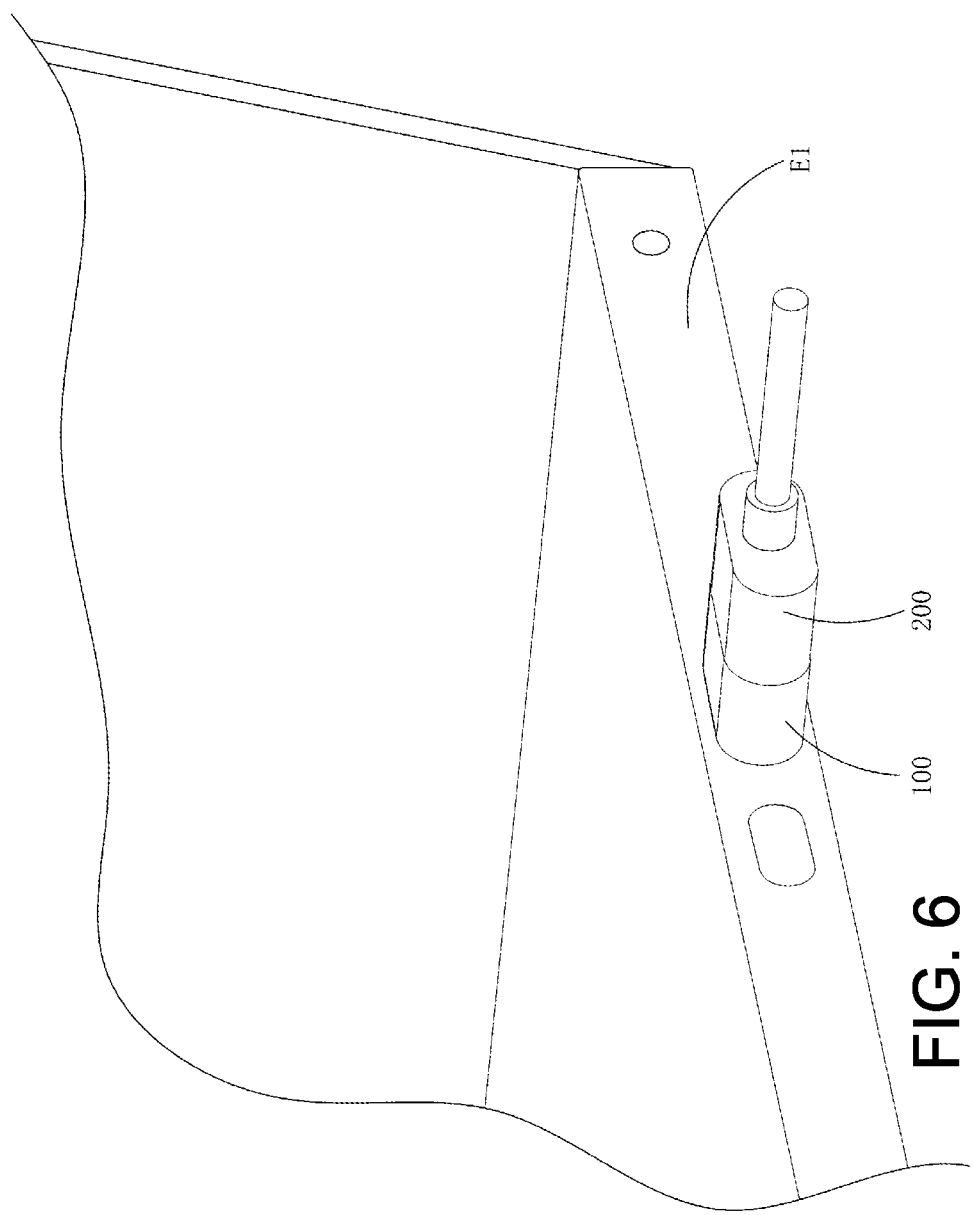
FIG. 6 is a schematic diagram showing the connection between the power transmitting cable and the external electronic expansion device when the external electronic expansion device is disposed at a first electronic device in an embodiment of the present disclosure.
Figure 7:
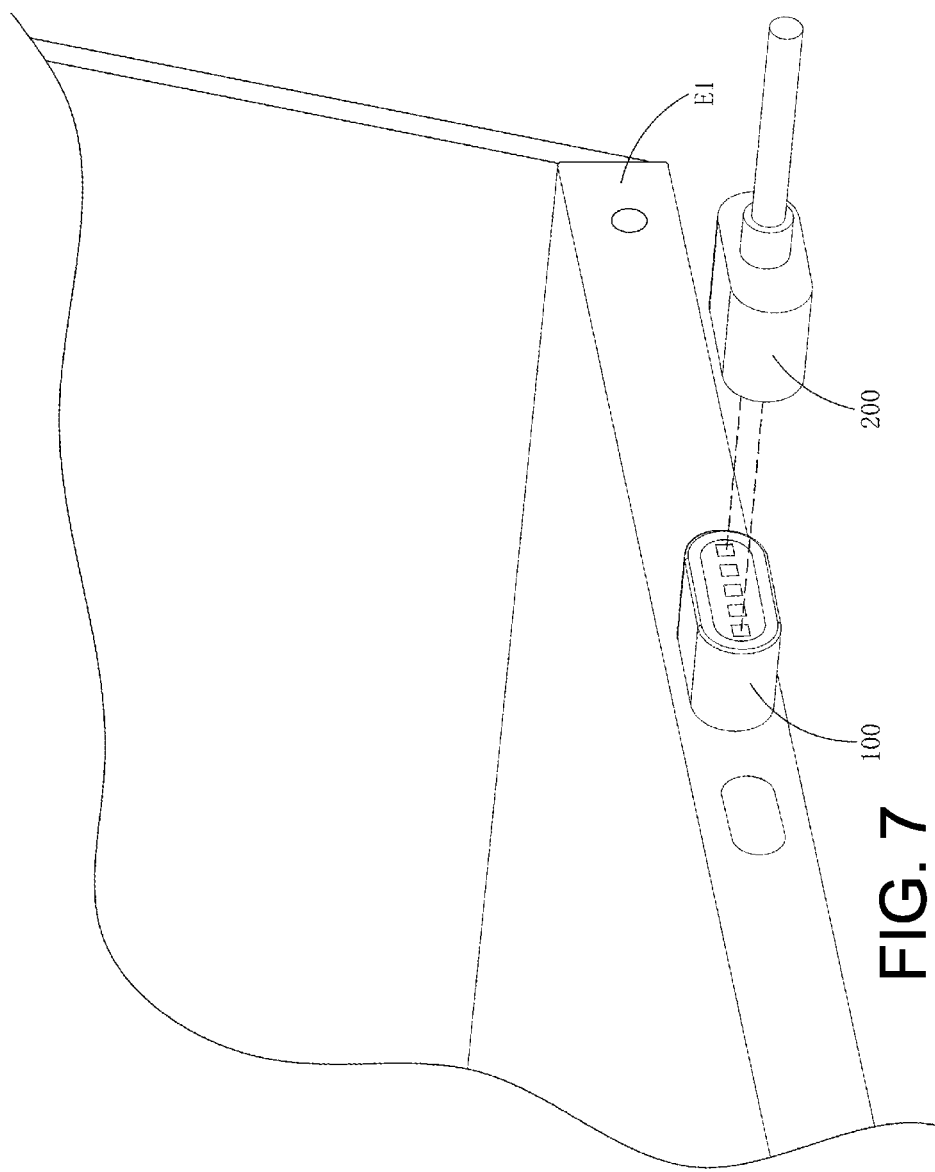
FIG. 7 is a schematic diagram showing the power transmitting cable being detached from the external electronic expansion device when the external electronic expansion device is disposed in the first electronic device in an embodiment of the present disclosure.

As shown in FIG. 2 and FIG. 3, the electrical connecting module 20 is disposed at the device body 10 and is exposed from the first wall surface 11, and is electrically connected to or detached from an interface of a first electronic device E1 (shown in FIG. 6 and FIG. 7). In this embodiment, the electrical connecting module 20 is a Type C USB plug connector, which can be inserted into a corresponding interface of the first electronic device E1 to transmit signals between the first electronic device E1 and the external electronic expansion device 100. In another embodiment, the electrical connecting module 20 could be a socket type connector, which is determined according to the interface type of the electronic device.

As shown in FIGS. 4(a), 4(b) and 5, the data signal processing module 30 is disposed in the device body 10 and is electrically connected with the electrical connecting module 20. In this embodiment, the data signal processing module 30 can be used to transmit data signals and can also be used to calculate data signals. The data signal processing module 30 comprises a data signal transmitting member 31, through which the data signal of the first electronic device E1 can be transmitted to the outside of the first electronic device E1 and the external data signal can be transmitted to the first electronic device E1. In this embodiment, the data signal transmitting member 31 is a wireless data signal transceiving member, such as a 2.4 GHz radio frequency wireless transceiving chip or a Bluetooth transceiving chip. In this embodiment, the external electronic expansion device 100 is a signal receiver cooperating with a wireless mouse or a wireless keyboard, and the first electronic device E1 is a laptop computer or a desktop computer. When input signals of the wireless mouse or the wireless keyboard are received by the data signal transmitting member 31, the signals would be transmitted to the first electronic device E1 through the electrical connecting module 20. In another embodiment, the external electronic expansion device 100 can also be an external Bluetooth communication device. Audio signals of the first electronic device E1 can be transmitted to an external Bluetooth speaker through the data signal transmitting member 31 of the data signal processing module 30. In another embodiment, the external electronic expansion device 100 can also be a wireless card. The first electronic device E1 is connected to a server through the data signal transmitting member 31 of the external electronic expansion device 100 for data loading or uploading. In other embodiments, the external electronic expansion device 100 can also be a transceiver or a radio frequency device of other mobile terminals.

As shown in FIGS. 4(*a*), 4(*b*) and 5, the power transmitting module 40 is disposed in the device body 10 and is electrically connected with the electrical connecting module 20. The power transmitting module 40 comprises a power transmitting interface 41 exposed from the second wall surface 12 (shown in FIG. 2), and further comprises a control member 42 for power transmission. As shown in the figures, the data signal transmitting member 31 of the data signal processing module 30 and the control part 42 of the power transmitting module 40 are disposed on two opposite surfaces of a circuit board P. One end of the circuit board P is close to the power transmitting interface 41. The power transmitting module 40 further comprises a plurality of first terminals 431, 432, 433, 434, and 435 disposed at the power transmitting interface 41 and on the second wall surface 12. The first terminals 431 and 435 are ground terminals (GND), the first terminals 432 and 434 are power terminals (Vbus), and the first terminal 433 is a detection terminal (CC). The first terminals 431, 432, 433, 434, and 435 are disposed on the circuit board P and are electrically connected with the ground terminal (GND), the power terminal (Vbus), and the detection terminal (CC) of the electrical connecting module 20, respectively.

As shown in FIGS. 4(*a*), 4(*b*) and 5, the first assembling member 50 is disposed at the power transmitting interface 41 for connecting with electronic components assembling to the power transmitting interface 41. In this embodiment, the first assembling member 50 comprises a magnetic attracting body close to the second wall surface 12. The first insulating covering sleeve 13 is formed by injection molding on the outside of the electrical connecting module 20, the data signal processing module 30, the power transmitting module 40, and the circuit board P. A first housing 14 is disposed at the outside the first insulating covering sleeve 13. The magnetic attracting body of the first assembling member 50 is annular and sleeved on the neck part 131 at the edge of the first insulating covering sleeve 13, and is disposed close to the first terminals 431, 432, 433, 434, and 435. An opening of the first housing 14 close to the second wall surface 12 comprises a flange 141, which stops the magnetic attracting body of the first assembling member 50 to position the magnetic attracting body between the first insulating covering sleeve 13 and the first housing 14.

As shown in FIG. 2 and FIG. 3, the power transmitting cable 200 comprises an expansion end connecting member 210 connected with the power transmitting interface 41 of the power transmitting module 40, a device end connecting member (not shown) electrically connected with the second electronic device, and a transmitting wire 220 electrically connected with the expansion end connecting member 210 and the device end connecting member. The device end connecting part can be determined according to the interface type of the second electronic device. For example, it can be a USB plug connector connected with a charging adaptor, and the second electronic device can be a charging adaptor or other devices that supply power.

As shown in FIGS. 4(*a*), 4(*b*) and 5, the expansion end connecting member 210 comprises a connecting member body 211 and a plurality of second terminals 212, 213, 214, 215, 216 disposed at the connecting member body 211 and electrically connected with the transmitting wire 220. The connecting member body 211 comprises a second insulating covering sleeve 2111 formed by injection molding and a second housing 2112 surrounding the second insulating covering sleeve 2111. The second insulating covering sleeve 2111 forms a third wall surface 2113 of the connecting member body 211. The second insulating covering sleeve 2111 also covers the second terminals 212, 213, 214, 215, 216, which are exposed from the third wall surface 2113. When the expansion end connecting member 210 is connected with the power transmitting interface 41, the second terminals 212, 213, 214, 215, and 216 would be electrically connected to the first terminals 431, 432, 433, 434, and 435, respectively. In this way, the power from the charging adaptor or other power devices can be transmitted to the power transmitting module 40 of the external electronic expansion device 100 through the device end connecting member of the power transmitting cable 200, the transmitting wire 220, and the expansion end connecting member 210 and then transmitted to the first electronic device E1 for charging. The power from the first electronic device E1 can also be transmitted to the second electronic device that needs to be charged through the power transmitting module 40 of the external electronic expansion device 100 and the power transmitting cable 200. For example, charging a mobile phone with the power from a desktop or laptop computer.

As shown in FIGS. 4(*a*), 4(*b*) and 5, the expansion end connecting member 210 further comprises a second assembling member 217 assembled or disassembled from the first assembling member 50. The second assembling member 217 comprises a magnetic attracting body close to the third wall surface 2113. The magnetic attracting body of the second assembling member 217 is annular. An edge of the second insulating covering sleeve 2111 close to the third wall surface 2113 comprises a flange 2114 which is folded backward. An annular gap exists between the flange 2114 and the second insulating covering sleeve 2111. The magnetic attracting body of the second assembling member 217 is sleeved on an outer peripheral surface of the second insulating covering sleeve 2111 and is accommodated in the annular gap between the flange 2114 and the second insulating covering sleeve 2111 to be positioned between the second insulating covering sleeve 2111 and the second housing 2112. The magnetic attracting body of the second assembling member 217 could be attracted to the magnetic attracting body of the first assembling member 50 so that the third wall surface 2113 could abut against the second wall surface 12. In this way, the power transmitting cable 200 can be connected with or detached from the external electronic expansion device 100. In this embodiment, the second terminals 212, 213, 214, 215, 216 are elastic terminals. Furthermore, the elastic terminals of this embodiment are pogo pins. When the third wall surface 2113 abut against the second wall surface 12, the second terminals 212, 213, 214, 215, 216 can be retractably kept in abutting against the first terminals 431, 432, 433, 434, 435.

As shown in FIG. 6, the external electronic expansion device 100 can be used with the power transmitting cable 200, allowing the external electronic expansion device 100 to realize expansion and charging at the same time. Besides, as shown in FIG. 7, the power transmitting cable 200 can be detached from the external electronic expansion device 100 to use only the expansion function of the external electronic expansion device 100.

In summary, embodiments of the present disclosure provide a multifunctional single-interface electronic expansion device and an external electronic expansion device. By installing the data signal processing module and the power transmitting module to the external electronic expansion device, and by disposing the power transmitting interface to the device body, the power transmitting cable can be electrically connected to the first electronic device through the power transmitting interface of the external electronic expansion device when the external electronic expansion device is electrically connected with the first electronic device. Thus, the data signal processing module and the power transmitting module can be operated at the same time by occupying only one interface of the first electronic device.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. An external electronic expansion device, comprising:
a device body comprising a first wall surface, a second wall surface, a first insulating covering sleeve and a first housing surrounding the first insulating covering sleeve;
an electrical connecting module disposed at the device body and exposed from the first wall surface, the electrical connecting module being electrically connected with or detached from an interface of a first electronic device;
a data signal processing module disposed in the device body and electrically connected with the electrical connecting module;
a power transmitting module disposed in the device body and electrically connected with the electrical connecting module, the power transmitting module comprises a power transmitting interface exposed from the second wall surface; and
a first assembling member disposed at the power transmitting interface and assembled with an electronic component connected to the power transmitting interface,
wherein the first assembling member comprises a magnetic attracting body close to the second wall surface, and the magnetic attracting body of the first assembling member is sleeved on the first insulating covering sleeve, and a flange of the first housing stops the magnetic attracting body.

2. The external electronic expansion device according to claim 1, wherein the data signal processing module comprises a data signal transmitting member; a data signal of the first electronic device is transmitted to the external of the first electronic device through the data signal transmitting member; an external data signal is transmitted to the first electronic device through the data signal transmitting member.

3. The external electronic expansion device according to claim 2, wherein the data signal transmitting member is a wireless data signal transceiving member.

4. The external electronic expansion device according to claim 3, wherein the wireless data signal transceiving member is a radio frequency wireless transceiving chip.

5. The external electronic expansion device according to claim 3, wherein the wireless data signal transceiving member is a Bluetooth transceiving chip.

6. The external electronic expansion device according to claim 1, wherein the power transmitting module further comprises a plurality of first terminals disposed at the power transmitting interface and on the second wall surface.

7. A multifunctional single-interface electronic expansion device, comprising:
an external electronic expansion device according to claim 1;
a power transmitting cable comprising an expansion end connecting member connected with the power transmitting interface, a device end connecting member electrically connected with a second electronic device, and a transmitting wire electrically connected with the expansion end connecting member and the device end connecting member.

8. The multifunctional single-interface electronic expansion device according to claim 7, wherein the expansion end connecting member comprises a connecting member body and a plurality of second terminals disposed at the connecting member body and electrically connected with the transmitting wire; the connecting member body comprises a third wall surface from which the plurality of the second terminals are exposed; when the expansion end connecting member is connected with the power transmitting interface, the plurality of second terminals are electrically connected to the first terminals.

9. The multifunctional single-interface electronic expansion device according to claim 8, wherein the expansion end connecting member further comprises a second assembling member assembled to or disassembled from the first assembling member.

10. The multifunctional single-interface electronic expansion device according to claim 9, wherein the second assembling member comprises a magnetic attracting body close to the third wall surface.

11. The multifunctional single-interface electronic expansion device according to claim 10, wherein the expansion end connecting member comprises a second insulating covering sleeve and a second housing surrounding the second insulating covering sleeve; the magnetic attracting body of the expansion end connecting member is sleeved on the second insulating covering sleeve and is embedded in a gap between the flange and an outer peripheral surface of the second insulating covering sleeve.

12. The multifunctional single-interface electronic expansion device according to claim 10, wherein the third wall surface of the connecting member body abuts against the second wall surface of the device body; the plurality of second terminals are elastic terminals.

* * * * *